United States Patent [19]

Krishnan

[11] 3,928,451

[45] Dec. 23, 1975

[54] METHOD OF PREPARING P-CHLOROPHENYLENEDIAMINE

[75] Inventor: Ram Murthy Krishnan, Akron, Ohio

[73] Assignee: The Goodyear Tire & Rubber Company, Akron, Ohio

[22] Filed: Nov. 25, 1974

[21] Appl. No.: 526,763

Related U.S. Application Data

[63] Continuation of Ser. No. 375,589, July 2, 1973, abandoned.

[52] U.S. Cl. ................................................ 260/580
[51] Int. Cl.² .......................................... C07C 85/11
[58] Field of Search ........... 260/575, 578, 580, 581, 260/375, 589

[56] References Cited

UNITED STATES PATENTS

| | | | |
|---|---|---|---|
| 3,149,161 | 9/1964 | Graham et al. ..................... | 260/580 |
| 3,350,452 | 10/1967 | Rylander et al. ................... | 260/580 |
| 3,474,144 | 10/1969 | Craig et al. ......................... | 260/580 |
| 3,499,034 | 3/1970 | Gonzalez ............................ | 260/580 |
| 3,565,921 | 2/1971 | Gobron et al..................... | 260/347.8 |
| 3,666,813 | 5/1972 | Hindin ................................ | 260/580 |
| 3,683,025 | 8/1972 | Pons ................................ | 260/580 X |

FOREIGN PATENTS OR APPLICATIONS

| | | | |
|---|---|---|---|
| 741,838 | 8/1966 | Canada................................ | 260/580 |
| 859,251 | 1/1961 | United Kingdom................. | 260/580 |

OTHER PUBLICATIONS

Rylander et al., "Engelhard Industries Tech. Bul." Vol. 6, pp. 11–16 (1965).

Brown et al., "J.A.C.S.", Vol. 84, p. 2828, 1962.

Houben-Wehl, "Methodern Der Organischen Chemie", Vol. 11/I, pp. 343–344, 1957.

*Primary Examiner*—Allen B. Curtis
*Attorney, Agent, or Firm*—F. W. Brunner; H. C. Young, Jr.

[57] ABSTRACT

Method of preparing p-chlorophenylenediamine which comprises hydrogenating 4-chloro-1,3-dinitrobenzene in a solvent solution in which said diamine is soluble at a pressure in the range of about 400 to about 1000 pounds per square inch gauge (psig) and at a temperature in the range of about 60° to about 120°C. in the presence of a reduced platinum on granular carbon catalyst which comprises about 0.5 to about 1.5 weight percent platinum, said catalyst characterized by having a nitrobenzene number in the range of about 2600 to about 3200, and further characterized by the platinum being reduced on the carbon support by at least 95 percent.

1 Claim, No Drawings

METHOD OF PREPARING P-CHLOROPHENYLENEDIAMINE

This is a continuation of application Ser. No. 375,589 filed July 2, 1973, now abandoned.

This invention relates to a method of preparing p-chlorophenylenediamine. The invention more particularly relates to a method of preparing p-chlorophenylenediamine by hydrogenating 4-chloro-1,3-dinitrobenzene.

Various primary diamines have particular use for cross-linking polyurethanes. An example of such a diamine is p-chlorophenylenediamine. However, its commercial use has been prohibitive primarily because of its difficulty of preparation and resulting high cost. Catalytic hydrogenation of 4-chloro-1,3-dinitrobenzene has heretofore been unsatisfactory for preparing p-chlorophenylenediamine because of substantial side reactions and the dehydrochlorination which occur.

It is, therefore, an object of this invention to provide an improved method of preparing p-chlorophenylenediamine. It is a further object of this invention to provide a method of catalytically hydrogenating 4-chloro-1,3-dinitrobenzene to prepare p-chlorophenylenediamine.

In accordance with this invention it has been discovered that a method of preparing p-chlorophenylenediamine comprises hydrogenating 4-chloro-1,3-dinitrobenzene in a solvent solution in which said diamine is soluble at a pressure in the range of about 400 to about 1000 pounds per square inch gauge (psig) and at a temperature in the range of about 60° to about 120°C. in the presence of a reduced platinum on granular carbon catalyst which comprises about 0.5 to about 1.5 weight percent platinum, said catalyst characterized by having a nitrobenzene number in the range of about 2600 to about 3200, preferably about 2800 to about 3000 and further characterized by the platinum being reduced on the carbon support by at least 95 percent and preferably at least 99 percent.

Such a catalyst can generally further be characterized by containing water to the extent that a typical loss in weight of water upon drying is about 60 to about 70 weight percent (LOD). It is generally desired that the fresh catalyst contains water in order to prevent the possibility of explosive reactions. As the typical catalytic reaction proceeds in practice, it may be reasonable to expect that the water can be replaced by solvent in the system.

The nitrobenzene number is calculated as the volume of hydrogen at standard temperature and pressure (STP) taken up over the first five minutes of reaction per gram of dry catalyst. The test is conducted by mixing 0.125 grams catalyst, 4.0 milliliters of nitrobenzene (AR grade) and 100.0 milliliters methyl alcohol (absolute anhydrous AR grade) and shaken in a Parr apparatus under 300 millimeters mercury pressure.

In the practice of this invention, although it is understood that the reduced platinum on the granular carbon support is the active catalytic site, other materials have been found present by analysis of the catalyst ash residue such as sodium and phosphorus compounds which are probably contained in the carbon support. For such an analysis, the catalyst is reduced to ash (it usually has an ash content of about one weight percent) by ordinary means such as by heating to about 275°C. for about 10 hours to constant weight.

It is preferred that the solvent used for the hydrogenation reaction is selected from about 85 to about 100 weight percent esters selected from ethyl acetate, propyl acetate and butyl acetate and correspondingly from 0 up to about 15 weight percent monoalcohols selected from methanol, ethanol, isopropanol and isobutanol.

In the practice of this invention it was found unexpectedly that the hydrogenation of the 4-chloro-1,3-dinitrobenzene in the presence of the required platinum catalyst and solvent resulted in a conversion of the dinitrobenzene to the diamine in the range of about 80 to about 90 mole percent with only a minimal dehydrohalogenation occurring. Typically, only about 10 to about 20 percent side reactions, including dehydrohalogenation, occurred. Thus, the 4-chloro-1,3-dinitrobenzene can be prepared substantially more efficiently and thus at a substantially lower cost than heretofore known prior art methods.

The hydrogenation reaction of this invention is generally conducted by mixing the 4-chloro-1,3-dinitrobenzene with the solvent to obtain a 20 to about 30 percent concentration therein based on the total solution, followed by mixing about 1 to about 3 weight percent of the reduced platinum on carbon catalyst with the solution. The amount of catalyst is generally not critical although a sufficient amount is used to enable an appreciable rate of hydrogenation and although about 3 to about 5 weight percent is typically optimum based on the dinitrobenzene. The temperature of the reactants is adjusted to about 60° to about 80°C. A dispersive hydrogen charging means is positioned beneath the surface of the liquid mixture to enable adequate contact with the 4-chloro-1,3-dinitrobenzene. Hydrogen pressure over the mixture is adjusted to about 400 to about 1000 pounds per square inch gauge (psig). As the reaction proceeds, an exotherm generally occurs which is held within a range of about 95° to about 140°C. for about 5 to about 10 minutes. After this time, with the exotherm subsiding, the reaction temperature is maintained at the previously adjusted range of about 60° to about 80°C. for about 1 to about 2 hours. Thus, the total effective reaction time is in the range of about 1 to 2 hours at a temperature range of about 60° to about 140°C. The pressure of the reaction system is maintained by the addition of hydrogen as needed through its charging means.

The product can then be recovered by filtering to remove the catalyst and by subsequent distillation under a reduced pressure or vacuum to remove the solvent. The recovered product can be purified by various methods such as crystallization from water to yield a product having a melting point in the range of about 88° to about 91°C. determined at a heating rate of about 1°C. per minute according to ASTM No. D-789.

The catalyst used in this invention is required to be platinum deposited on a substrate of granular charcoal. Typically, the granules are of a particle size in the range of about 200 to about 400 U.S. standard mesh size. The granular charcoal, for example, can be of the type prepared by controlled wood burning.

The catalyst is of the type which can generally be prepared by methods familiar to those having skill in the catalyst preparation art such as by contacting chloroplatinic acid with charcoal under hydrogenation conditions to deposit a chloride of platinum thereon, followed by reducing it to elemental platinum with a valence of zero.

The solvent used for the hydrogenation reaction of this invention is required to comprise an ester with ethyl acetate being preferred. Although it is preferred that substantially 100 weight percent ester is used as the solvent, the solvent can comprise up to about 15 weight percent of a monoalcohol with ethanol and isopropanol being preferred.

The practice of this invention is further illustrated by reference to the following example which is intended to be representative rather than restrictive of the scope of the invention. Unless otherwise indicated, all parts and percentages are by weight.

EXAMPLE I

To a reactor was charged 75 parts of ethyl acetate and 25 parts of 4-chloro-1,3-dinitrobenzene. The reactor was then flushed with hydrogen for about 30 seconds to displace any air within. The reactants were adjusted to a temperature of about 60°C. A sparger was fitted to the reactor to enable the hydrogen to be admitted to the reactor and dispersed beneath the surface of the liquid mixture. A turbine agitator was fitted to the reactor to enable rapid stirring.

To the reactor was then charged 1 part of a catalyst consisting of 1 weight percent reduced platinum on carbon at 64.35 percent LOD, obtained from the Calsicat Company. The reactor was closed, the agitator started and hydrogen introduced through the sparger to produce a pressure in the range of about 400 to about 500 psig. The reaction immediately began with an initial exotherm in the range of about 95° to about 120°C. which lasted for about 10 to 15 minutes. The reaction exotherm subsided to a reaction temperature in the range of about 60° to about 80°C. where it was allowed to continue for a further period of about 1 hour for a total reaction time of about 1¼ hours. The mixture was taken from the reactor and the catalyst removed therefrom by filtration. The solvent was removed by vacuum distillation to a temperature of about 30°C. and a reduced pressure of about 27.5 inches of mercury. The resulting distilland product was recrystallized in water to provide p-chlorophenylenediamine of at least 97 percent purity with a melting point of about 88° to about 91°C. according to ASTM No. D-789 at a heating rate of about 1°C./minute with a Fisher-Jones apparatus.

In the conduct of this reaction, only minimal if any, side reactions involving dehydrohalogenation occurred. A theoretical yield of p-chlorophenylenediamine that could be expected from the 4-chloro-1,3-dinitrobenzene was 70.5 weight percent based on 100 percent conversion. The actual yield of this experiment was 62.6 weight percent according to gas chromatographic analysis with an overall conversion of 100 percent. Thus, 89 percent of the dinitrobenzene converted to the diamine and 11 percent converted to byproducts. Such a conversion is very acceptable on a practical economic basis.

A portion of the p-chlorophenylenediamine prepared according to this example was then used to satisfactorily cure a polyurethane prepolymer of a diisocyanate and a polymeric polyol.

In the description of this invention, it should be readily understood that the method of this invention relates to the preparation of p-chlorophenylenediamine as p-chloro-m-phenylenediamine since it is required to be prepared from 4-chloro-1,3-dinitrobenzene.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing p-chloro-m-phenylene diamine which consists essentially of hydrogenating 4-chloro-1,3-dinitrobenzene in a solution containing about 20 to about 30 percent 4-chloro-1,3-dinitrobenzene of an acetate solvent selected from at least one ethyl acetate, propyl acetate and butyl acetate at a pressure in the range of about 400 to about 1000 psig and at a temperature in the range of about 60° to about 120°C in the presence of about 1 to about 3 weight percent of a reduced platinum on granular carbon catalyst, based on the total solution, having a particle size in the range of about 200 to about 400 U.S. Standard mesh size containing essentially about 0.5 to about 1.5 weight percent platinum, said catalyst having a nitrobenzene number in the range of about 2600 to about 3200, said platinum on the granular carbon being reduced by at least about 99 percent to a zero valence state, and where said nitrobenzene number is the volume of hydrogen at standard temperature and pressure (STP) taken up over the first five minutes of reaction per gram of dry catalyst from the result of mixing 0.125 gram catalyst, 4.0 milliliters of nitrobenzene and 100.0 milliliters anhydrous methyl alcohol, where said mixture is shaken in a Parr apparatus under 300 millimeters mercury pressure.

* * * * *